3,507,349
Patented Apr. 21, 1970

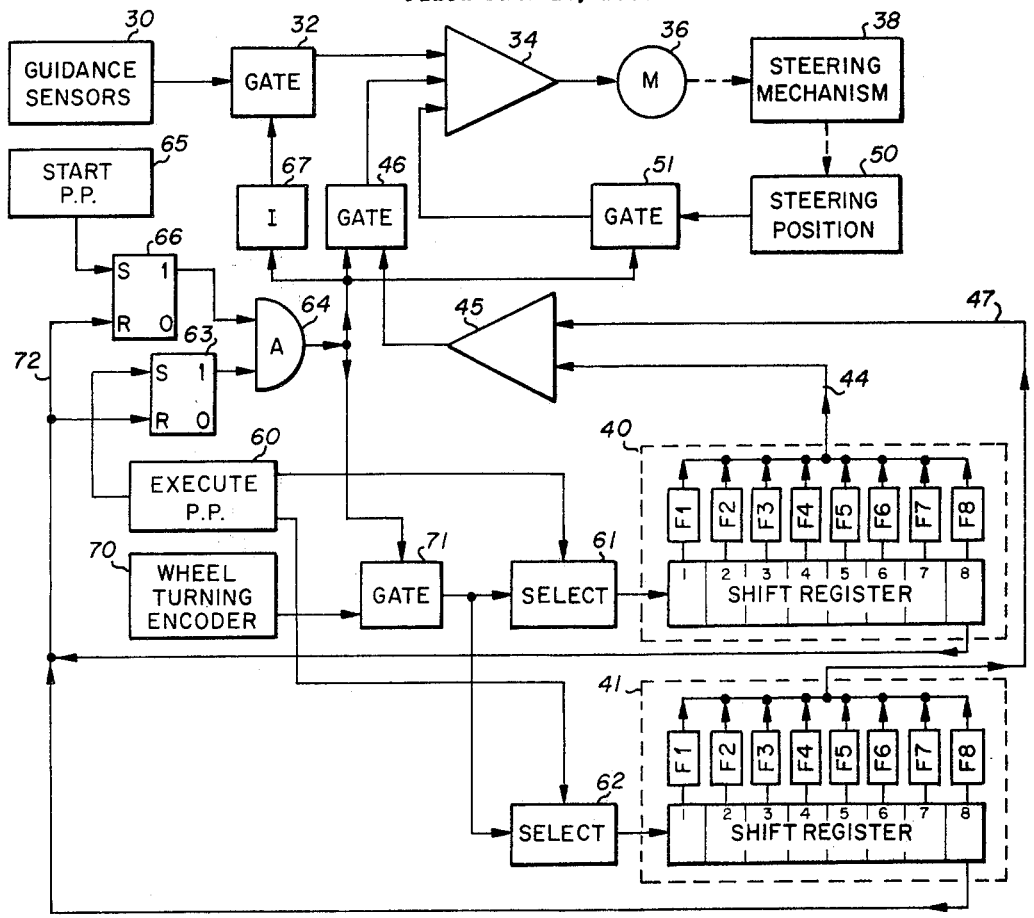
Fig_2
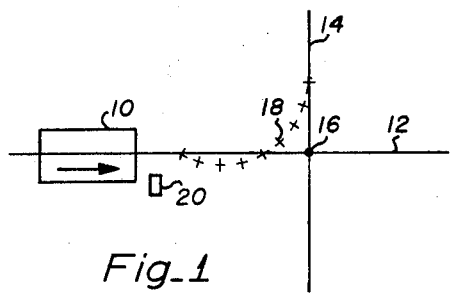
Fig_1
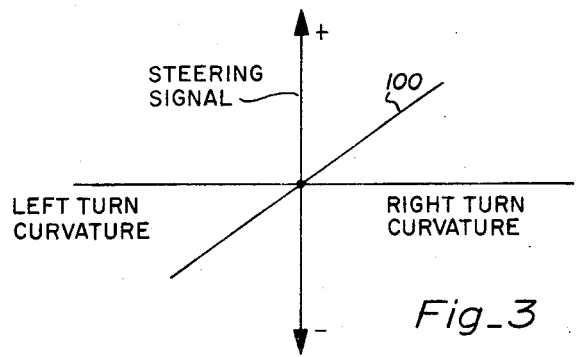
Fig_3
INVENTORS
DONALD T. COMER
ARTHUR J. CRITCHLOW
BY
ATTORNEY

United States Patent Office

3,507,349
MEANS FOR DIRECTING A VEHICLE, NORMALLY UNDER THE CONTROL OF A GUIDANCE SYSTEM, TO FOLLOW A PROGRAMMED PATH INDEPENDENT OF THE GUIDANCE SYSTEM
Donald T. Comer, Los Gatos, and Arthur J. Critchlow, San Jose, Calif., assignors to Mobility Systems, Inc., San Jose, Calif., a corporation of California
Filed Jan. 16, 1968, Ser. No. 698,217
Int. Cl. B62d 15/00
U.S. Cl. 180—98          9 Claims

ABSTRACT OF THE DISCLOSURE

A programming means for controlling the steering mechanism of a guided vehicle independent of the guidance system when the guided vehicle approaches a decision point formed by a plurality of diverging guide paths. The programming means utilizes a shift register to control a plurality of function generators which provide steering signals for the steering mechanism to steer the vehicle along a programmed path between a starting point and an ending point. Successive steering signals steer the vehicle along successive segments of the programmed path, and switching to the next steering signal takes place each time a selected distance has been traversed by the vehicle.

BACKGROUND OF THE INVENTION

Field of the invention

This invention relates to a vehicle guidance system in which a mobile vehicle is guided along a guidance path and, more particularly, to such a system in which the mobile vehicle is controllable to follow a programmed path independent of the guidance path to control its motion across decision points of the traffic layout of the guidance system.

In vehicle guidance systems, a vehicle is generally guided along a guidance path by utilizing sensor means which detect the guidance path and which provide a guidance signal which is applied to a steering control means to steer the vehicle along the guidance path. The means defining the guidance path may take any one of many different forms such as, for example, an electrical, magnetical, optical, radiation, or mechanical path means.

Vehicle guidance systems employing an electrical conductor as the guidance path defining means are disclosed in U.S. Letters Patents 3,009,525 and 3,033,305. More particularly, the vehicle guidance systems there disclosed are for driverless mobile vehicles which follow conductors laid to define a traffic layout. The conductors are energized by an alternating current to establish an alternating electromagnetic field around them which can be detected by the sensors carried by the vehicle. Generally, the sensors develop a signal which provides an indication of the direction and magnitude of the lateral displacement of the vehicle from the conductor, and which is utilized to control the steering mechanism to follow the conductor.

In such vehicle guidance systems, and particularly those having a complex traffic layout in which a plurality of paths diverge from a single point, also referred to as a decision point or intersection, it is necessary to provide means for selecting one of several possible guidance paths for the mobile vehicle as it passes a decision point.

By way of a specific example, a decision point may take the form of two guidance paths which cross at right angles, such as a street intersection. Accordingly, and assuming the four paths diverging from the intersection to coincide with the cardinal points of the compass, a mobile vehicle approaching the decision point in a northerly direction has a choice of either continuing across the intersection in a northerly direction or to turn to a westerly or easterly direction. This invention relates to a means and method for directing the vehicle across the decision point in such a manner that it will intercept and thereafter follow the selected path.

Description of the prior art

A number of schemes have been proposed by the prior art to direct a mobile vehicle across a decision point in such a manner that the vehicle will follow, or intersect for subsequent following, a selected guidance path.

One of the schemes proposes a guidance path layout in which the various guidance paths, diverging from the decision point, are energized by alternating current signals of different frequencies so that the guidance path sensors of the mobile vehicle could be switched from one frequency to another for guidance path selection. More specifically, a vehicle moving in a northerly direction by following a guidance path energized at a first frequency may have its sensors switched to a second frequency prior to reaching the decision point for a westerly turnoff.

This arrangement has a number of disadvantages which include the use of at least two different frequencie requiring additional equipment both for the guide path layout and the mobile vehicle, and the necessity of guided transitions whereby every turnoff is guidably controllable along the entire curve or transition. This latter requirement, for a decision point exceeding more than two choices from any direction of approach, entails very complex transition guidance paths since approaches can be from several directions.

Another scheme proposes to supplement the guidance control means for steering the vehicle with an auxiliary control means which locks the steering mechanism to steer the vehicle along a direction which corresponds to the direction of the vehicle immediately preceding lock-up. Such lock-up persists for a preset period of time or distance after which the auxiliary system is disabled and the guidance system takes over again.

This arrangement likewise has some serious limitations in that it requires rather simple decision points which allow only a selection between two choices, and one of the choices is limited to a continuation of a path which is straight across the decision point. This limitation is due to the fact that the auxiliary system can only lock up the steering mechanism in steering the vehicle in a direction in which it travelled just prior to lock-up. Accordingly, there must be a guidance path straight across the decision point which may be interrupted since the auxiliary system will control the vehicle across such an interruption. The interruption also allows the vehicle to follow one other guidance path since, while transitioning the interruption, there is no guidance along the straight across path. Therefore, without actuating the auxiliary steering system, the vehicle can be guided away from the straight across path at the point where there is an interruption of the path.

SUMMARY OF THE INVENTION

It is an object of the present invention to provide an improved means and method for controlling a mobile vehicle, which is steered along a guidance path layout, cross a decision point in such a manner that the vehicle is brought into guidance proximity with a selected one of the guidance paths diverging from the decision point.

It is a further object of this invention to provide a mobile vehicle, having a steering control means, which takes over from the normal guidance path steering control and which steers the vehicle to execute selected maneuvers such as following a selected path independent of the guidance path layout. The steering control means is responsive to a programming means whereby the steering mechanism of the vehicle may be controlled to follow a preselected path at a preselected angle of turn and rate of turn which may be variable in fixed increments of time or distance covered.

It is still another object of the present invention to provide a programming means for guided vehicles, normally tracking a guidance path, by which the vehicle may be guided along a selected path in a selected manner with selected speeds, rates, turns and the like, under circumstances where guidance path control is either not desirable or feasible, or where guidance path control is to be suspended in favor of guiding the vehicle across a decision point to a selected one of the guidance paths diverging from the decision point.

It is another object of this invention to provide a guidance path layout for decision points which are not suitable for tracking except to pass straight across, and to provide means whereby the vehicle can be maneuvered into coincidence with a selected guidance path for subsequent tracking.

Briefly, the stated objects are accomplished by providing a vehicle guidance system in which a mobile vehicle is normally tracking a guidance path. When approaching a decision point, control of vehicle steering is taken over by a programming means which steers the vehicle across the decision point into coincidence with a selected guidance path for further tracking. The simplest maneuver executed by the programming means is a programmed turn which directs the vehicle into coincidence with the selected guidance path so that control can once more be assumed by the normal vehicle tracking system.

A suitable programming means may take the form of a plurality of function generators, each of which provides a steering signal suitable to steer the vehicle along a sector of the programmed path. A shift register is utilized to control the function generators so that one generator at a time provides a steering signal. Shifting to the next generator is accomplished by sensing the distance (or, in the alternative, the time or markers) traversed by the vehicle and shifting each time the vehicle traverses a sector of the programmed path.

A programmed path is started, after selection of a program, by a start signal which is usually generated by a proximity coding means in the form of a marker which indicates that the vehicle is approaching a decision point. Shifting of the register, and thereby generating successive steering signals, is accomplished by a shift signal commensurate with the position of the vehicle, such as a pulse means connected to a vehicle wheel. The shift signal in general may be furnished by any encoder or sensor which provides an increment of vehicle travel. The wheel direction (angle of turn) turns to a certain angle when the register is in the first position, and after each wheel revolution the register shifts to a new position providing a preselected angle of turn of the wheels.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

BRIEF DESCRIPTION OF THE DRAWING

FIG. 1 is a diagram showing a pair of intersecting guidance paths and the prescribed path for the programmed turn;

FIG. 2 is a schematic block diagram of the control system for making programmed turns; and FIG. 3 is a curve showing the relationship between the programmed steering signal and the programmed path curvature.

DESCRIPTION OF THE PREFERRED EMBODIMENT

Referring now to the drawing and preliminarily to FIG. 1 thereof, there is shown a guided vehicle 10 proceeding in an easterly direction along a guidance path 12 which is west of a decision point 16 formed by the intersection of path 12 with another guidance path 14. Normally, when vehicle 10 proceeds along guidance path 12, guidance sensors in the vehicle continually compare the position of the vehicle in relation to path 12 and provide an error signal when the vehicle deviates from some center position. This error signal is utilized to control a steering mechanism in vehicle 10 whereby the vehicle will return to and track path 12. As the vehicle proceeds towards decision point 16, it may be controlled to continue in an easterly direction or may be controlled to turn either in a northerly or southerly direction to intercept guidance path 14.

As will become better understood hereinafter, if vehicle 10 is directed to turn in a northerly direction to intercept path 14, the normal tracking system must be disabled and vehicle 10 must be steered, without benefit of a guidance path, along a programmed path as indicated by path 18. Encoder 20 is a means located on the guidance path layout for providing vehicle 10 with a signal indicating that it has approached a position with respect to the decision point from which it must start on its programmed path, such as path 18, for subsequently intercepting guidance path 14 and proceeding in a northerly direction.

Referring now to FIG. 2 of the drawing, there is shown the circuitry carried by mobile vehicle 10 to steer the vehicle along a guidance path and a programmed path in accordance with the present invention. Basically, the circuitry comprises a guidance path steering control means which operates in conjunction with the guidance path, and a programmed path steering control means which operates in conjunction with a programming means.

The guidance path steering control means comprises sensor means 30 for detecting the guide path and for developing a steering signal which is utilized by a control means to control a steering means 38 to steer the vehicle along the detected guidance path. The control means comprises an amplifier means 34 whose output is connected to a steering motor 36 which controls steering mechanism 38. The guidance steering signal is gated by a gate means 32 which is normally open. Feedback of the guidance system just described is provided by the guide path over which the vehicle travels, and a suitable sensor means 30 to perform the sensing function may comprise spacially oriented coils such as are disclosed in U.S. Patents Nos. 3,009,525 or 3,033,305.

The programmed path steering control means comprises at least one programming means such as 40 for developing suitable programmed steering signals, and a control means for utilizing these steering signals to control steering means 38 to steer the vehicle to follow a predetermined path. The control means includes an amplifier means 45 whose output is connected to amplifier means 34. A suitable feedback path is provided by a steering position or wheel angle indicator 50 which develops a signal commensurate with the steering wheel position for comparison with the programmed steering signal. Both the programmed steering signal and the feedback signal are gated by suitable gate means 46 and 51 which are normally closed and which are opened by the gating signal provided by AND gate 64. Because gate 32 is selected as normally open and gates 46 and 51 as normally closed, and adopting the convention that a true signal opens a gate, an inverter 67 is provided in the gating signal lead to gate 32 so that a true gating signal will close gate 32 and open gates 46 and 51.

Programming means, such as 40, may take any number of forms and is essentially a programmed steering signal function generator. In the illustrated embodiment, the programming means comprises an eight-stage shift register having positions No. 1 to No. 8 and eight function generators F1 to F8. Each function generator F is controlled by an associated stage of the shift register in such a manner that, when the stage is "on" or "true," the associated function generator provides an output signal which forms the programmed steering signal which is applied, via output lead 44, to amplifier means 45.

For greater versatility, each vehicle may be provided with a number of programming means, one such additional programming means being shown at 41. Each programming means steers the vehicle along a different prescribed path, and selection of a particular path may be made by a signal from an encoder such as marker 20. Programming means 41 is likewise connected, via output lead 47, to amplifier means 45.

The individual function generators F may take the form of weighted resistors connected to positive or negative sources of potential to form suitable steering signals. The steering signals are generally positive for a wheel position to one side of the vehicle center line and negative for the other side. Further, because of the position of the feedback loop, the magnitude of the programmed steering signal is directly proportional to the turning angle of the vehicle steering wheel. FIG. 3 illustrates a curve 100 which represents a plot of steering voltage versus curvature of the vehicle path. Curve 100 illustrates that the greater the steering voltage, the greater is the path curvature and the tighter is the turn. Further, curve 100 illustrates that negative voltages produce left turns, and positive voltages produce right turns, and zero voltage produces a straight ahead motion.

Finally, there is provided logic circuitry to implement the transfer from guidance path steering to programmed path steering, to change the programmed steering signal to allow for more complex maneuvers than just an ordinary constant turn, to select a particular programming means and thereby the maneuver, and to develop the necessary signals to commence the above operations at a certain location with respect to the decision point.

A box 60 labeled "Execute PP" (Programmed Path) is a means which must be set to alert the system that, upon the occurrence of certain events, a programmed path is to be followed. Box 60 accomplishes two separate functions—it selects the particular maneuver to be performed, that is, an appropriate programming means to provide a selected prescribed path, and it enables the system logic to commence a programmed turn (or following a programmed path) when arriving at a predetermined location. Selection is accomplished by enabling one of select gates 61 and 62 which are connected into the shift pulse line of the registers of programming means 40 and 41. These select gates are coupled to command box 60, and a true signal on the gate signal line opens the selected gate (but not the other). Also, command box 60 has an output line connected to the set terminal of a bistable means 63 whose "true" output enables AND gate 64. It will be remembered that AND gate 64 provides the gating signal to transfer control from the guidance steering signal to the programmed steering signal.

A command box 65 labeled "Start PP" (Programmed Path) is receptive to encoder 20 (FIG. 1), and provides a start signal when brought into close proximity therewith. The start signal is applied to the set terminal of a further binary device 66 whose true signal is applied to AND gate 64.

The eighth or last stage of the programming means registers are also connected to a common reset line 72 which is connected to the reset terminal of bistable devices 63 and 66. Finally, there is provided a shift means for sequentially changing the programmed steering signal in the form of wheel turning encoder 70. Encoder 70 provides a shift pulse each time the vehicle travels through a given distance and this pulse is applied, via a gate 71 controlled by the gating signal from AND gate 64, to the register of the selected programming means.

The operation of the present invention will now be explained in connection with the guidance paths and decision points depicted in FIG. 1 in which vehicle 10 is to follow programmed path 18 for intercepting guidance path 14 in a northerly direction. The first step is to provide a programming means capable of providing steering signals to steer the vehicle along path 18. This is usually accomplished by breaking path 18 into a number of constant arc length segments having substantially constant radius of curvatures. Assuming that the path was divided into eight segments and that the radius of curvature of each portion was determined, the next step is to generate programmed steering signals which provide the so-determined steering angle. This, of course, can be accomplished by consulting curve 100 of FIG. 3 and utilizing voltage sources supplying appropriate signals.

Since eight equal length arc segments have been selected to approximate path 18, an eight-position shift register is utilized to control eight function generators, each generator providing programmed steering signals as explained. Assume that programming means 40 is constructed to provide steering along path 18. The next step is to place the system in readiness to execute the programmed path 18 when at a predetermined position which is done by setting command box 60 to select programming means 40 and to enable device 63. Vehicle 10 is now set for the succeeding events and will continue to proceed in an easterly direction along guide path 12 until it passes over encoder means 20 which sets device 66 indicating that the vehicle is at the predetermined position to transfer control to the programmed path steering control means. Setting of device 66 causes a "true" gating signal to pass through previously enabled AND gate 64 and to disable gate 32 and enable gates 46, 51 and 71. Of course, if box 60 had not set bistable device 63, gate 64 would have remained disabled, and control would have remained with the guidance path steering control means.

The gating of gates 46 and 51 causes the immediate application of the first programmed steering signal (function generator F1) to amplifier 34 to commence steering the vehicle along the first segment of path 18. Wheel turning encoder 70 will advance at the end of each segment to shift the register step-wise to successively apply different programmed steering signals to steering mechanism 38 to steer the vehicle along the various sectors of the programmed path. As the last sector of programmed path 18 is reached, the register will provide a reset signal which resets devices 63 and 66 to thereby make the gating signal from AND gate 64 false which closes gate 32 to turn the guidance of the vehicle over to guidance sensors 30.

The system shown in FIG. 2 is merely illustrative of the preferred embodiment of this invention, and is simplified wherever possible. In actual practice, provisions are made to assure that transfer from the guidance control means to the programmed control means coincides with a shift pulse from encoder 70 so that full programmed control is provided throughout the full first segment of the programmed path. Further, the first function generator F1 and the last function generator F8 are usually not connected to the first and last stages of the shift register to assure that no signal is applied to amplifier 45 while the register is in the first or reset position. The reason for this is that the non-selected programming means should not provide an output signal when in the reset position. Since the last stage of the shift register usually initiates a reset of bistable devices 63 and 66, and thereby a transfer of control back to the guidance path control means, no programmed guidance needs to be provided during this period. Of course, as an alternate arrangement, the reset pulse may be originated at the time that the shift register is cycled from position 8 to position 1.

It is also within the contemplation of the present invention to utilize an encoder, such as 70, which provides shift pulses on a time basis rather than a distance traveled basis, or by other means such as markers on the floor. Still further, function generators F may, for the execution of complex maneuvers, provide time varying functions for increasing or decreasing the turning radius in some preselected manner. If the function generators provide constant voltage steering signals, the adjacent steering signals should not differ too much from one another since the turning rate is a function of the difference between adjacent steering signals. More particularly, the rate of change is proportional to the difference in the amplitude of the adjacent steering signals divided by a constant time interval which corresponds to the switching interval. Providing function generators capable of delivering time varying functions is one way to control the rate of change of turning. Of course, instead of providing complex function generators, the number of stages of the shift register and function generators may be increased so that the change in steering signals between adjacent segments becomes smaller.

There has been described hereinabove a vehicle guidance system in which sensors located on the vehicle guide the vehicle along a guidance path. There is further provided a programming means whereby control from the guidance sensor is turned over to a programming means to enable the vehicle to follow a programmed path. A programmed path is utilized to guide the vehicle across a decision point for interception with a selected guide path for further guidance along the intercepted path.

What is claimed is:

1. In a vehicle having a steering means for use in a guidance path system which includes at least one decision point at which a plurality of guidance paths diverge from each other, and proximity means for providing a start signal when said vehicle approaches within a selected distance to said decision point, the improvement comprising:

guidance path steering control means including, sensor means for detecting said guide path and for developing a guidance steering signal, and a first control means responsive to said guidance steering signal and operative to control said steering means to steer said vehicle along said detected path;

programmed path steering control means including, position dependent programming means for deriving programmed steering signals commensurate with a curve linear programmed path across the decision point, and a second control means responsive to said programmed steering signals and operative to control said steering means to steer said vehicle along said programmed path independently of a guide path;

first normally closed circuit means for connecting said guidance path steering control means to said steering means;

second normally open circuit means for connecting said programmed path steering control means to said steering means; and control transfer means responsive to said start signal for simultaneously opening said first circuit means and closing said second means whereby steering control of said vehicle is transferred from said guidance path steering control means to said programmed path steering control means.

2. In a vehicle in accordance with claim 1 in which said programmed path is selected to start at a starting point along the guidance path on which said vehicle approaches said decision point and an ending point along a selected guide path on which said vehicle is to leave said decision point.

3. In a vehicle in accordance with claim 2 in which said control transfer means is responsive to a characteristic indicative of the fact that the vehicle has reached said ending point and operative to simultaneously close said first circuit means and open said second circuit means.

4. In a vehicle in accordance with claim 1 in which said programmed path steering control means includes a feedback circuit for providing a feedback signal commensurate with the position of said steering means.

5. In a vehicle in accordance with claim 1 in which said programming means comprises a function generator providing programmed steering signals whose amplitudes and polarities are changeable with a selected characteristic of said vehicle as the same follows said programmed path.

6. In a vehicle in accordance with claim 5 in which said function generator is constructed to provide a different programmed steering signal each time that vehicle traverses a predetermined distance.

7. In a vehicle in accordance with claim 5 in which said function generator is constructed to provide a different programmed steering signal at the end of the expiration of a predetermined time interval.

8. In a vehicle in accordance with claim 1 in which said programming means comprises a shift register having a plurality of output positions and a function generator associated with an output position and enabled by the "on" output position of said shift register, and means for advancing said shift register from a starting position at the beginning of said programmed path to an ending position at the end of said programmed path.

9. In a vehicle in accordance with claim 8 in which said means for advancing said shift register comprises a wheel turning encoder which provides a shift signal each time a wheel of said vehicle passes predetermined points.

References Cited

UNITED STATES PATENTS

| | | | |
|---|---|---|---|
| 3,039,554 | 6/1962 | Hosking et al. | 180—79.1 X |
| 3,172,496 | 3/1965 | Rabinow et al. | 180—98 X |
| 3,245,493 | 4/1966 | Barrett | 180—98 |

A. HARRY LEVY, Primary Examiner

U.S. Cl. X.R.

180—79.1